Feb. 24, 1970 E. A. PETROCELLI ET AL 3,497,614
ELECTRONIC VIDICON IMAGE SIZE CONTROL
Filed July 31, 1967 2 Sheets-Sheet 1
Fig. 1
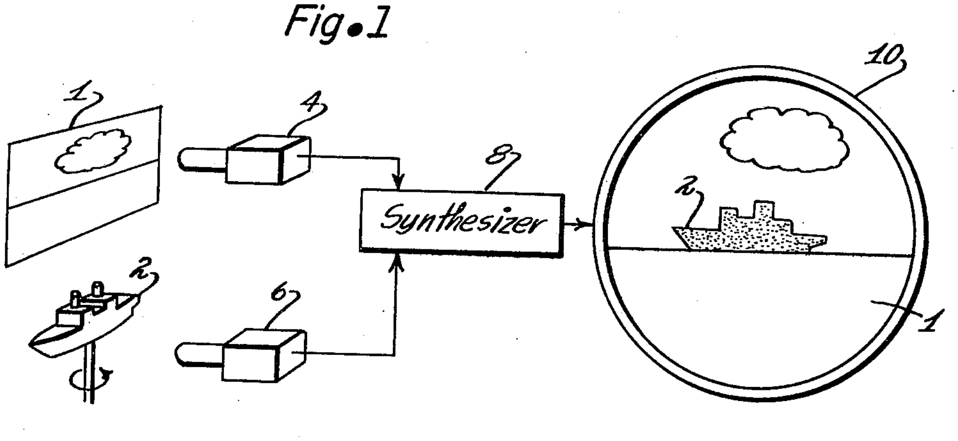
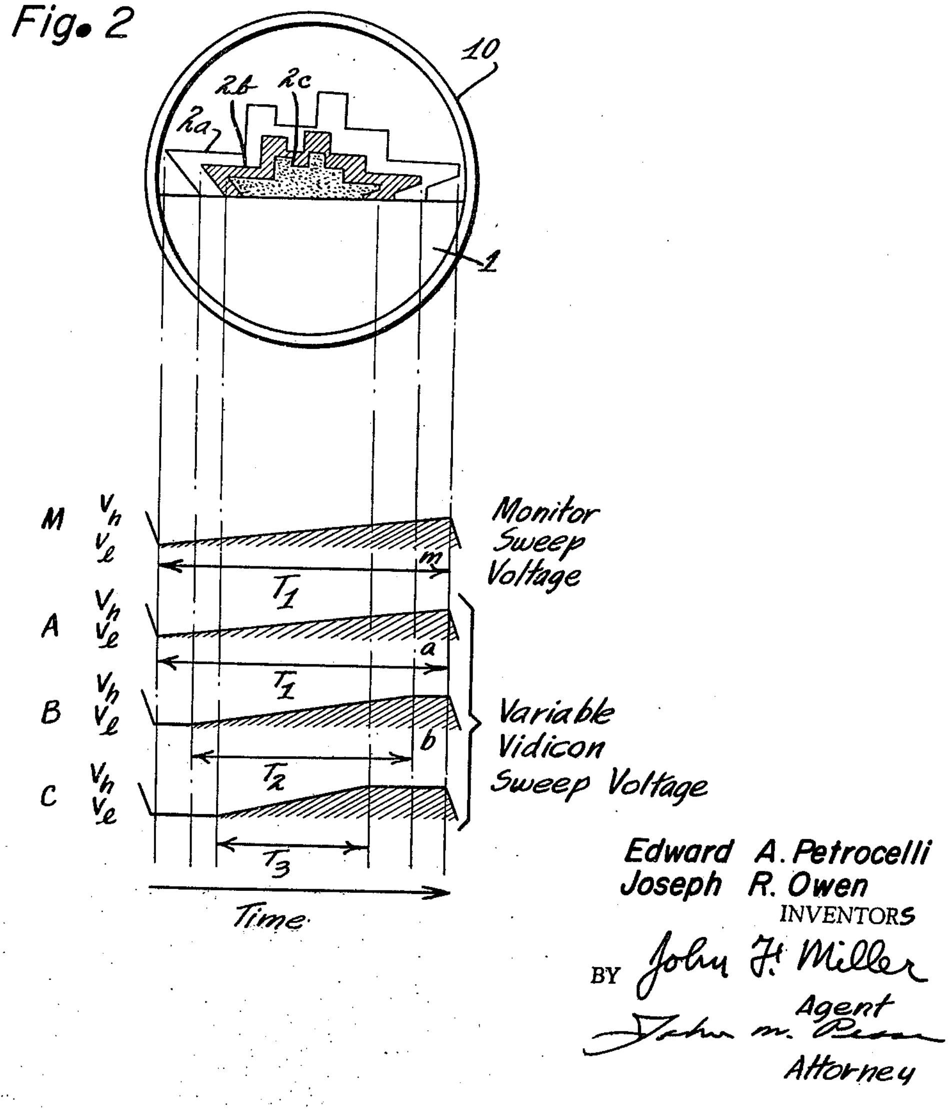
Edward A. Petrocelli
Joseph R. Owen
INVENTORS
BY John F. Miller
Agent
John M. Pease
Attorney

ELECTRONIC VIDICON IMAGE SIZE CONTROL

Filed July 31, 1967 2 Sheets-Sheet 2

Edward A. Petrocelli
Joseph R. Owen
INVENTORS
BY John F. Miller
Agent
John M. Pierce
Attorney

United States Patent Office 3,497,614
Patented Feb. 24, 1970

3,497,614

ELECTRONIC VIDICON IMAGE SIZE CONTROL

Edward A. Petrocelli and Joseph R. Owen, Orlando, Fla., assignors to the United States of America as represented by the Secretary of the Navy Continuation-in-part of application Ser. No. 580,835, Sept. 20, 1966. This application July 31, 1967, Ser. No. 657,733
Int. Cl. H04n 5/38, 3/00
U.S. Cl. 178—7.2 1 Claim

ABSTRACT OF THE DISCLOSURE

In the parent invention, "Apparent Target Motion Control," there is disclosed a plurality of TV cameras or "vidicons," one of which scans a replica of a seascape background scene and one or more others of which may scan respective replicas of model targets such as, for example, model ships. A synthesized picture including the background scene and one or more target ships is presented on a TV monitor. The present invention is a solid state sweep voltage generator adjustable to increase or decrease the rate of change of the camera sweep voltage with reference to the rate of change of a TV monitor sweep voltage. This increase or decrease may be accomplished smoothly and gradually in a camera which is scanning a target ship model. This results in an increase or decrease in the size of the target ship image on the screen of the TV monitor, thereby electronically simulating a change in range of the target ship as viewed on the TV monitor screen. The effect is similar to that obtained by using an optical "zoom" lens.

CROSS-REFERENCE TO RELATED APPLICATIONS

This application is a continuation-in-part of the copending application of Hanns H. Wolff titled "Apparent Target Motion Control," Ser. No. 580,835, now Patent No. 3,420,953 filed Sept. 20, 1966. That application is a continuation-in-part of the copending application of Hans H. Wolff titled "Electronic Synthesizer," Ser. No. 535,659, filed Mar. 14, 1966.

BACKGROUND OF THE INVENTION

This invention is in the field of television and has particular utility in electronic training devices. Various expedients have been employed to change the size of an image on a TV picture tube. The optical zoom lens has been employed with TV cameras for the purpose but it is heavy, delicate, and expensive, and not compatible with electronic controls. In the apparatus of the present inventions, the "Electronic Synthesizer" and "Apparent Target Motion Control" over scanning and under scanning of the TV camera and changing the slope of the camera sweep voltage by adjusting the heater voltage in a tungsten cathode tube have been used. Over scanning requires high voltages and the second method is subject to the limitations of tube circuitry.

SUMMARY OF THE INVENTION

A solid state device for accomplishing electronically in a TV system the effect of an optical "zoom" lens. Apparatus is provided wherein a flip-flop is arranged to control a variable sweep voltage generator which can generate a sawtooth voltage at a predetermined rate. The rate of change of the sweep voltage is varied by adjusting a variable resistor which controls the charging rate of a storage capacitor. The flip-flop discharges the capacitor and restarts the charging process at intervals determined by a sync pulse input. The apparatus being comprised of solid state devices is lighter, more rugged, simple, and inexpensive, compared to the prior art expedients.

BRIEF DESCRIPTION OF THE DRAWING

FIG. 1 shows the apparatus of the parent inventions;

FIG. 2 shows sweep voltage wave shapes generated by the invention;

DESCRIPTION OF THE PREFERRED EMBODIMENT

Figure 3:
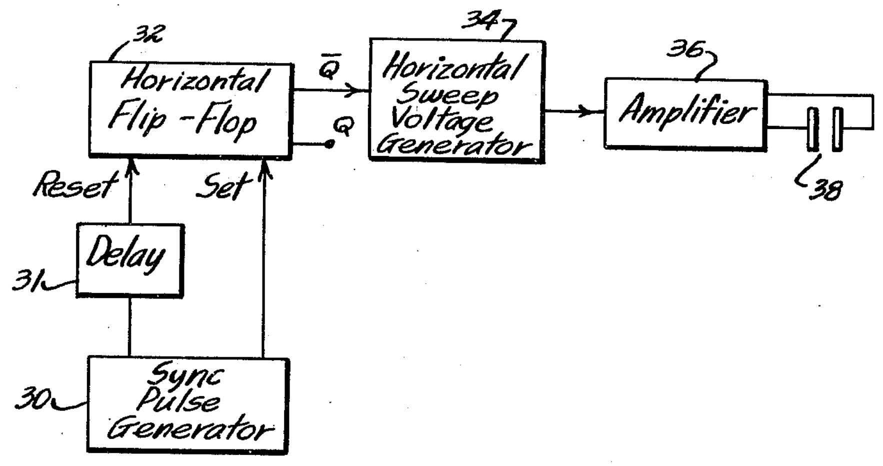
FIG. 3 is a functional block diagram of the invention.

FIG. 1 illustrates the principals of the parent inventions. In general, a background scene 1 is scanned by a TV camera 4 and one or more model targets such as a ship 2 are scanned by one or more respective cameras such as a camera 6. The video outputs of the cameras are combined in a synthesizer 8 and presented as a composite picture including background scene 1 and target ship 2 on the screen of a TV monitor 10. Monitor 10 is constructed to simulate a periscope and the apparatus can be used to train Naval personnel in periscope and submarine operations. Circuit means in synthesizer 8 can cause the image of target ship 2 to move across the screen of monitor 10 or to increase or decrease in size to simulate a change in range.

The present invention is an improved circuit for simulating a change in range by changing the size of the target ship image. This is done by changing the rate of change of the camera sweep voltages with respect to the rate of change of the monitor sweep voltages. The principle is illustrated in FIG. 2, where three images of target ship 2 are shown superimposed on each other against background scene 1 on the screen of monitor 10. These images are labeled 2*a*, 2*b*, and 2*c*, respectively, and simulate the view on monitor 10 when target ship 2 is located at three different ranges from an observer. The waveshape *m* on line M represents the waveshape developed in a horizontal sweep voltage generator in monitor 10. This voltage is applied to the horizontal deflection plates of the picture tube in monitor 10 to sweep the scanning beam completely across the face of the tube in a manner well known in the art. The waveshapes *a*, *b*, and *c* on lines A, B, and C, represent waveshapes developed in the horizontal sweep voltage generator of camera 6 in FIG. 1. The sweep voltage generators of the monitor 10 and cameras such as camera 6 are synchronized and the sync voltages usually increase at the same rate. This is shown by waveshapes *m* and *a* in FIG. 2 which start together at a low voltage $V_l$ and increase to a maximum voltage $V_h$ in time $T_1$. The target information from camera 6 presented during a sweep of the electron scanning beam across the face of the picture tube of monitor 10 is a function of the time taken to sweep the electron scanning beam across the screen in the tube of camera 6. When the electron beams in monitor and camera scan at the same rate, completing a scan in time $T_1$, as illustrated by waveshapes *m* and *a*, the image of target ship 2 shown as 2*a* fills the screen of monitor 10. Now, if the rate of change of the camera sweep voltage is increased so as to rise from $V_l$ to $V_h$ in a shorter time, $T_2$, target information from camera 6 will be forwarded to monitor 10 during only a part of the monitor scanning time $T_1$ and the image of target ship 2 will be reduced proportionately as shown by the reduced size of image 2*b*. If the rate of change of the camera sweep voltage is increased further so as to rise from $V_l$ to $V_h$ in a still shorter time, $T_3$, the image of the target ship will be decreased proportionately as illustrated by image 2*c*. No target information is forwarded from camera 6 while the sweep voltage is at $V_l$ or $V_h$ levels since the scanning beam is off the screen at one side or the other during these periods. In the actual apparatus, the rate of change of the vertical sweep voltages for the camera is controlled in a similar manner in synchronism with the control of the horizontal sweep voltages, however, only the control of the horizontal sweep voltages is discussed herein order to simplify the explanation.

The manner in which the rate of change of the camera sweep voltages are varied is illustrated in FIG. 3. Here a sync pulse generator 30 which is common to the cameras and to the monitor furnishes a sync pulse through a delay 31 to the reset input of a flip-flop 32 and furnishes a sync pulse directly to the set input of flip-flop 32. Sync pulse generator 30 and delay 31 form no part of the present invention but are part of the apparatus of the parent inventions. Flip-flop 32 is labeled horizontal flip-flop because it is connected to the horizontal sweep voltage generator. When the delayed sync pulse is applied to the reset input of flip-flop 32 its output terminal Q is tied to ground and a positive signal from output terminal $\overline{Q}$ is furnished to horizontal sweep voltage generator 34. Generator 34 then develops a linear sawtooth voltage such as *a, b,* or *c,* of FIG. 2, the rate of change being adjusted in accordance with the desired target range to be simulated. This sweep voltage rises from $V_1$ to $V_h$ and is fed through an amplifier 36 to the horizontal deflection plates 38 of camera 6 which scans model target ship 2 (FIG. 1). Some time after flip-flop 32 is reset by the delayed sync pulse, an undelayed sync pulse is received at the set input. This causes 32 to switch, thereby bringing output $\overline{Q}$ close to ground and allowing the sweep voltage output of 34 to return to $V_1$, thus causing the scanning beam of camera 6 to fly back and wait until the next delayed sync pulse is received at the reset input of flip-flop 32.

Figure 4:
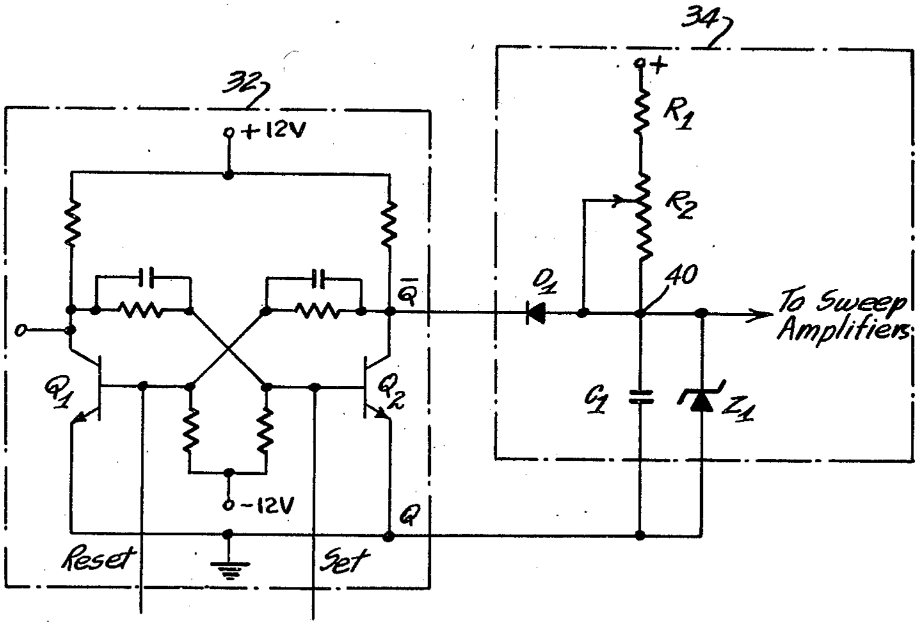
FIG. 4 shows the circuits of the invention in detail.

The circuitry of flip-flop 32 and horizontal sweep voltage generator 34 is shown in FIG. 4. Flip-flop 32 is comprised of two transistors $Q_1$ and $Q_2$. The output of $Q_2$ is connected through a diode $D_1$ to a junction point 40. A capacitor $C_1$ and a Zener diode $Z_1$ are connected in parallel between point 40 and the emitter of $Q_2$, which is grounded. A resistor $R_1$ and a variable resistor $R_2$ are connected in series between a positive voltage and point 40.

In operation, assuming that flip-flop 32 has been reset by a delayed sync pulse and that transistor $Q_1$ is conducting, capacitor $C_1$ will charge to a voltage determined by the Zener voltage of Zener diode $Z_1$. A sync pulse to the base of transistor $Q_2$ from sync pulse generator 30 will then switch flip-flop 32 and cause $Q_2$ to conduct. When $Q_2$ conducts capacitor $C_1$ will discharge to ground across $Q_2$. A negative output pulse is thereupon furnished from point 40 to the sweep circuit amplifier 36 connected to the deflection plates 38 of camera 6. Since the output pulse from point 40 approaches ground the electron beam of camera 6 will fly back to its starting position.

When a subsequent delayed sync pulse from delay circuit 31 is received at the base of transistor $Q_1$, 32 switches again, $Q_1$ conducts and cuts off the conduction of $Q_2$. When transistor $Q_2$ ceases to conduct, capacitor $C_1$ begins to charge again through resistors $R_1$ and $R_2$. As capacitor $C_1$ charges the voltage increase at junction 40 is amplified by the amplifier 36 and fed to the deflection plates of camera 6, thereby causing the electron scanning beam to scan across the camera screen at a rate determined by the charging rate of capacitor $C_1$. This charging rate may be varied by adjusting variable resistor $R_2$. Thus $R_2$ may be varied to cause the camera sweep voltage to increase from $V_1$ to $V_h$ in a time $T_1$, $T_2$, $T_3$, or any length of time within the limits of the apparatus. Thus what amounts to an electronic zoom lens is made available to change the range of an image on a TV picture tube.

Obviously many modifications and variations of the present invention are possible in the light of the above teachings. It is thmerefore to be understood that within the scope of the appended claims the invention may be practiced otherwise than as specifically described.

The invention described herein may be manufactured and used by or for the Government of the United States of America for governmental purposes without the payment of any royalties thereon or therefor.

We claim:

1. In a television apparatus, the improvement comprising:

solid state electronic means for varying the size of an image on a TV picture tube, said means including a flip-flop arranged to control the starting and stopping of a sweep voltage generator of a TV camera associated with said TV picture tube;

said flip-flop being controlled by a sync pulse to its set input and a delayed sync pulse to its reset input;

said sweep voltage generator comprising a storage capacitor connected in series with a variable resistor;

the rate of change of the voltage developed in said sweep voltage generator being a function of the adjustment of said variable resistor;

a Zener diode connected in parallel with said storage capacitor to limit the voltage on said capacitor;

said flip-flop being arranged to control the charging and discharging of said storage capacitor; and wherein said flip-flop comprises a first transistor and a second transistor, said second transistor having an emitter connected to one plate of said storage capacitor and having a collector connected to the other plate of said capacitor, and means to discharge said storage capacitor through said second transistor.

References Cited

UNITED STATES PATENTS 3,002,153 9/1961 Williams ------------ 328—63

OTHER REFERENCES

Dobkin, FET-Diode Generator Has Linear Sawtooth Sweep Electronic Design, pp. 94–95, vol. 11, No. 19, Sept. 13, 1963.

RICHARD MURRAY, Primary Examiner

ROBERT L. RICHARDSON, Assistant Examiner

U.S. Cl. X.R.

178—6.8; 307—228; 315—29; 328—185